March 20, 1956
W. H. ELLIOT ET AL
SPEED CONTROL SYSTEM FOR ALTERNATING CURRENT INDUCTION MOTORS
Filed Jan. 30, 1953
2,739,279
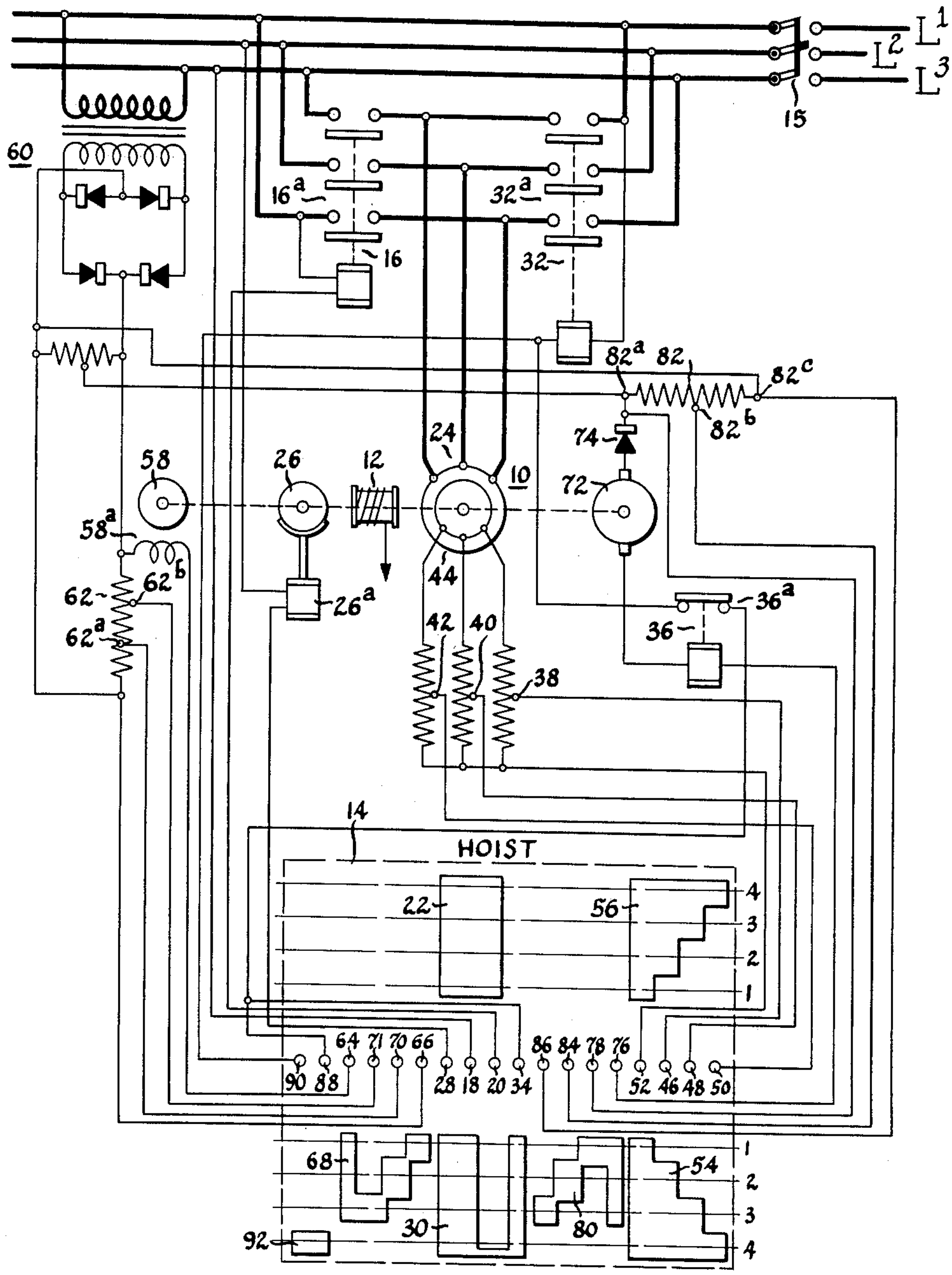
Inventors.
William H. Elliot
Edwin W. Seeger
By W. C. Lyon
Attorney 2,739,279
Patented Mar. 20, 1956

2,739,279

SPEED CONTROL SYSTEM FOR ALTERNATING CURRENT INDUCTION MOTORS

William H. Elliot, Whitefish Bay, and Edwin W. Seeger, Wauwatosa, Wis., assignors to Cutler-Hammer, Inc., Milwaukee, Wis., a corporation of Delaware Application January 30, 1953, Serial No. 334,306

10 Claims. (Cl. 318—204)

This invention relates to a speed control system for alternating current induction motors; and while not limited thereto, is particularly adapted for use with motors handling overhauling loads.

A primary object of this invention is to provide a system for controlling both the maximum and the minimum speed of such overhauling loads.

In certain applications where a motor is subjected to an overhauling load it is required for speed control that the motor be operated to aid the overhauling action of the load. When this is done there is danger that the load will over-speed. To prevent such over-speeding some control systems have heretofore utilized an eddy current brake coupled to the motor shaft together with means to vary the degree of energization of the brake, and thereby its braking effect, in accordance with the position of the power adjusting controller for the motor. In such prior control systems, however, the motor opposes the action of the brake regardless of the speed attained by the load so that a large brake is required.

Accordingly it is another object of this invention to provide a control system for motors subjected to overhauling loads in which the motor is de-energized when the load has attained predetermined speeds thus permitting the use of a smaller brake.

A further and a more specific object is to provide such a system in which the speed at which the motor is de-energized, the resisting effect of the torque resisting device and the adjustment of the power adjusting means for the motor are controlled in predetermined correspondence.

Other objects and advantages of the invention will hereinafter appear.

The accompanying drawing illustrates diagrammatically an embodiment of the invention which will now be described, it being understood that other embodiments are possible, and that the embodiment illustrated is susceptible of various modifications without departing from the spirit and scope of the invention as defined by the appended claims.

Referring to the drawing, there is shown a motor 10 for driving a hoist 12 represented as a drum and a cable attached to and wound thereupon for connection with a load. A multi-position reversing type master switch 14 is provided for completing connections for supplying power to motor 10 from supply lines $L^1$, $L^2$, and $L^3$ and for this purpose the switch 14 is provided with contact fingers and segments.

With line switch 15 closed and the master switch 14 in any hoisting position, contactor 16 is energized from lines $L^1$ and $L^3$ through fingers 20 and 18 and a segment 22. Normally open contacts 16$^a$ of contactor 16 are thereupon closed to connect the stator windings 24 of motor 10 for energization in the hoisting direction from lines $L^1$, $L^2$, and $L^3$. Similarly, with master switch 14 in any hoisting position the brake release winding 26$^a$ of a friction brake 26, connected to the shaft of motor

10, is energized from lines $L^2$ and $L^3$ through fingers 28 and 18 and segment 22.

In all lowering positions of master switch 14, brake winding 26$^a$ is energized from lines $L^2$ and $L^3$ through contacts 28 and 18 and segment 30 and a contactor 32 is energized from lines $L^1$ and $L^3$ through fingers 34 and 18, segment 30 and the normally closed contacts 36$^a$ of an over-speed relay 36. Upon energization of contactor 32 its contacts 32$^a$ close to complete connections for energization of stator windings 24 in the lowering direction from lines $L^1$, $L^2$ and $L^3$.

Resistors 38, 40 and 42 are connected in star across the rotor windings 44 of motor 10 and have taps which are respectively connected to fingers 46, 48 and 50. A common terminal of the resistors is connected to finger 52. In lowering position 4 of switch 14, the taps of resistors 38, 40 and 42 are respectively connected through fingers 46, 48 and 50 and segment 54 to finger 52 so that the resistance in circuit with rotor winding 44 is of minimum value. As switch 14 is successively placed in lowering positions 3, 2 and 1, fingers 50, 48 and 46 are sequentially disconnected from segment 54 and the resistance in circuit with the rotor winding 44 is correspondingly increased in steps. It is well known that as this resistance is increased less power is supplied to motor 10 from the supply lines.

In the hoisting positions of switch 14, the variation of the rotor circuit resistance is identical with that described for the lowering positions of switch 14 with the exception that segment 56 then performs the functions aforedescribed in connection with segment 54.

In addition to friction brake 26 which operates as hereinbefore described to hold the motor only when switch 14 is in off position or when the power supply fails, the motor is provided with an electro-speed responsive torque resisting device 58 connected to its shaft. The device selected for illustration is an eddy current brake or a magnetic particle brake having an operating winding 58$^a$ which is energized to provide a resisting effect, the value of which increases with the amount of energization and as a function of the speed of motor 10. By adjusting the magnitude of the excitation current, the resisting effect is made dependent on the speed in different predetermined degrees. Unidirectional current for winding 58$^a$ is supplied by a full-wave rectifier 60 from supply lines $L^1$ and $L^3$. The output of rectifier 60 is applied to the ends of a voltage divider resistor 62. In lowering position 1 winding 58$^a$ is energized across the ends of resistor 62 through fingers 66 and 64 and segment 68 for maximum energization. In lowering position 2 this excitation is reduced, winding 58$^a$ being connected to the left-hand end of resistor 62 and to a tap 62$^a$ through fingers 64 and 70 and segment 68. The excitation of winding 58$^a$ is further reduced in lowering position 3 in which the tap 62$^b$ and finger 71 are substituted for tap 62$^a$ and finger 70. Torque resisting device 58 is not energized in reverse position 4 nor in any forward position of master switch 14.

In lowering position 1 of switch 14, the operating winding of relay 36 is energized by a tachometer generator 72, driven by the hoist motor 10, through a circuit including a half-wave rectifying element 74, fingers 76 and 78 and a segment 80. Relay 36 is calibrated to open its contact 36$^a$ upon attainment of a voltage of predetermined magnitude. Since generator 72 is driven by motor 10 and also inasmuch as the generated voltage of the former is proportional to speed, relay 36 is calibrated to open contact 36$^a$ at a preselected speed of motor 10. Although the voltage at which relay 36 is calibrated to operate and the speed-voltage characteristic of generator 72 both remain unchanged, the speed of motor 10 at which relay 36 is calibrated to operate may be modified by the addition of a calibration or bias voltage in the circuit.

A portion of the output current of full-wave rectifier 60 is applied to voltage divider resistor 82 which has one end 82ª connected to rectifier 74, a tap 82ᵇ connected to finger 84, and its other end 82ᶜ connected to finger 86.

In lowering position 2 of switch 14 relay 36 is connected in series circuit with generator 72, rectifier 74, that portion of resistor 82 between end 82ª and tap 82ᵇ, finger 84, segment 80, and finger 76. The voltage of resistor 82 from end 82ª to tap 82ᵇ (the bias voltage) has polarity to oppose the voltage generated by generator 72 when motor 10 operates in its lowering direction.

Rectifier 74 has connection in the direction with respect to the polarity of the voltages of resistor 82 and generator 72 to permit current flow in the relay from the latter but to prevent such current flow from resistor 82. Thus only when the generator rotates in the lowering direction of motor 10 to generate a voltage greater in magnitude than that between points 82ª and 82ᵇ will current flow in relay 36; and not until the voltage of generator 72 is greater by an amount equal to the operating voltage of relay 36, will the latter open its contacts 36ª.

In lowering position 3 of switch 14, the full voltage across resistor 82 is applied to relay 36 through fingers 76 and 86 and segment 80 to oppose the voltage of generator 72 which must turn faster to overcome the bias voltage. Thus motor 10 is permitted to run faster in its reverse direction before contacts 36ª are opened and the motor is deenergized. In lowering position 4 relay 36 is not energized and contact 36ª is short-circuited through contacts 88 and 90 and segment 92.

The operation of this system with a load tending to overhaul the motor is as follows: When master switch 14 is placed in lowering position 1, the friction brake is released, motor 10 is energized for operation in the lowering direction, the rotor circuit resistance is maximum for minimum power input to the motor, torque resisting device 58 is energized for maximum resisting effect, and none of the calibration of bias voltage across resistor 82 is applied in circuit with the energizing winding of relay 36 and tachometer 72 to oppose the tachometer voltage. In this position relay 36 will be operated to open the motor energization circuit at a slow lowering speed of the load. As the lowering speed increases the resisting effect of torque resisting device 58 increases. If the load speed increases, by overhauling of the motor or otherwise, beyond the predetermined limit, the tachometer generator voltage will be great enough to cause relay 36 to open contacts 36ª and de-energize the motor, whereupon the load speed is controlled only by the resisting effect of torque resisting device 58.

To permit greater load speed, master switch 14 is placed in lowering position 2. In this position the motor is energized for operation in its lowering direction; the rotor circuit resistance is large for low power input to the stator winding 24; the torque resisting device 58 has maximum energization, and the tachometer generator 72 is opposed by a calibration voltage of small magnitude.

To permit further increase in load speed, master switch 14 is placed in lowering position 3 wherein the motor 10 is energized in its lowering direction; the rotor circuit resistance is reduced for higher speed operation; the energization of the torque resisting device 58 is reduced a predetermined amount for reduced resisting effect, and a higher calibration voltage is applied in series opposition with tachometer generator 72. If the speed of the load rises above a predetermined limit contacts 36ª open and the motor remains de-energized until the torque resisting device 58 has reduced the speed sufficiently to reduce the voltage of generator 72 to permit contacts 36ª to close.

Master switch 14 is placed in position 4 for maximum speed operation in the lowering direction. In this position the torque resisting device 58 is de-energized and the motor has minimum rotor resistance for maximum energization; relay 36 is disconnected, and its contacts 36ª are short-circuited through fingers 88 and 90 and segment 92.

It will be apparent that a greater or lesser number of switch positions could be provided for different degrees of speed control. Resistor 82 could be provided with additional taps to provide bias voltages of different magnitudes to oppose or aid the voltage of tachometer 72 and thus effect operation of relay 36 at various other predetermined motor speeds.

Relay 36 may be a polarized relay in which case rectifier 74 may be omitted. Moreover, the bias potential provided by rectifier 60 and resistor 82 may be obtained from any unidirectional current source. Also, tachometer 72 may be replaced by other means for obtaining a voltage dependent on the speed of motor 10. For example, the voltage across the secondary windings of the motor 10 might be utilized since this voltage varies with speed.

As hereinbefore described the electro-speed responsive torque resisting device 58 may be an eddy current brake or a magnetic particle brake. The speed-torque characteristic of the magnetic particle brake is more linear at low speeds than is that of the eddy current brake. In addition the magnetic particle brake provides a braking effect at zero speed while the eddy current brake does not. Thus the coordination of these brakes with the means to de-energize the motor and the means to vary the power supplied to the motor will differ somewhat in low speed operation, and the desirability of one of these characteristics over the other in a particular application will in part determine whether the eddy current type or the magnetic particle type of brake should be used.

We claim:

1. For an electric motor, in combination, means for applying a braking torque to the motor, said means being of a type in which braking effect is proportional to motor speed, means responsive to motor speed for de-energizing the motor, said braking means and said de-energizing means being controllable to vary the braking torque applied to the motor and the speed at which said motor is de-energized, respectively, and means for controlling said braking means and said de-energizing means for varying the torque applied to the motor and the speed at which said motor is de-energized in a preselected relationship.

2. For an electric motor, in combination, power adjusting means for adjusting the power delivered to the motor, motor torque resisting means for applying a braking torque to the motor and being of the type in which braking torque is proportional to motor speed, motor power interrupting means responsive to motor speed for interrupting the supply of power to the motor, said torque resisting means and said power interrupting means being controllable to vary the braking torque of said torque resisting means and the motor speed at which said motor power is interrupted, respectively, and means for controlling said power adjusting means and said torque resisting means and said power interrupting means for varying the power supplied to the motor and the motor braking torque and the speed at which motor power is interrupted in preselected correspondence.

3. In combination, an alternating current induction motor, means for varying the power supplied to said motor, brake means for applying a braking torque to said motor and being of a type having a winding and in which the braking effect is proportional to energization of said winding, means for de-energizing said motor, means responsive to motor speed for operating said deenergizing means and being adjustable to operate said deenergizing means at one of a plurality of selected motor speeds, and control means coacting with said means for varying the power applied to the motor and said brake means and said means for operating said deenergizing means for varying the power supplied to said motor and the braking torque applied to said motor and the motor speed at which said deenergizing means is operated in a coordinated relation.

4. The combination defined in claim 3 in which said brake means comprises a magnetic particle brake.

5. In combination, an alternating current induction motor having a shaft, an eddy current brake coupled to said shaft and having an energizing winding, means for interrupting the power connections to said motor, means responsive to motor speed for operating said means to interrupt motor power and being adjustable to operate said means to interrupt motor power at one of a plurality of selected motor speeds, and control means to vary the power supplied to said motor and the degree of energization of said winding and the adjustment of said means to operate said means to interrupt motor power in a preselected coordinated relation.

6. In combination, an alternating current induction motor having primary and secondary windings; a resistor interconnecting said secondary windings; brake means for applying a braking torque to the motor and being of the type in which braking torque is proportional to motor speed; means for interrupting power connections to the primary windings of said motor at one of a plurality of selected motor speeds comprising an electromagnetic contactor having contacts in the energizing circuit for said primary windings, means responsive to motor speed for applying to said contactor a voltage proportional to motor speed and means for opposing energization of said contactor by said means responsive to motor speed until said voltage proportional to motor speed has attained one of a plurality of preselected values; and control means coacting with said means first mentioned and said braking means and said means for opposing energization of said contactor to vary selectively the effective value of said resistor, the degree of energization of said braking means and the speed at which said motor is deenergized in a preselected relation.

7. For an alternating current induction motor, in combination, a brake for applying braking torque to the motor, said brake being of a type whose braking effect is proportional to motor speed and which comprises an energizing winding whose energization further determines braking effect, apparatus responsive to electrical energization to deenergize said motor, means responsive to motor speed for applying to said apparatus an electrical potential proportional to motor speed, means responsive to the magnitude of said potential for preventing application of said potential to said apparatus, and control means for varying in preselected correspondence the energization of said winding of said brake and the potential at which said means second mentioned is effective to prevent application of said potential to said apparatus.

8. In combination, a source of alternating current power, an alternating current induction motor having primary and secondary windings, a resistor interconnecting said secondary windings, a contactor having normally open contacts in the energizing circuit for said primary windings, a tachometer generator coupled to the shaft of the motor and being of a type in which magnitude and polarity of the generated voltage is indicative of motor speed and rotational direction, respectively, a source of adjustable unidirectional voltage, a half-wave rectifier connected in a series circuit with said tachometer generator and said source of unidirectional voltage, circuit means for energizing said contactor when the voltage across said series circuit reaches a selected magnitude, a brake having an energizing winding, said brake being coupled to the shaft of said motor and being of the type in which the braking effect is proportional to the energization of said winding, a source of adjustable voltage connected to said winding, and control means for adjusting the voltage of each of said sources and the effective impedance of said resistor in predetermined correspondence.

9. For an electric motor, in combination, means for applying of braking torque to said motor, said means being of a type whose braking effect is dependent upon motor speed, means for adjusting said braking torque, means for deenergizating said motor, means responsive to the speed of said motor for operating said deenergizing means, means for adjusting said speed responsive means to effect operation of said deenergizing means at a plurality of motor speeds, and means coacting with said means for adjusting said braking torque and said means for adjusting said speed responsive means for varying said baking torque and the speed at which said motor is deenergized in preselected correspondence.

10. The combination defined in claim 9, including means to vary the power delivered to said motor, and means to adjust said means to vary the power delivered to said motor, and in which said means coacting with said means for adjusting said braking torque and said means for adjusting said speed responsive means also coacts with said means to adjust said means to vary the power delivered to said motor for varying in preselected relationship the power delivered to said motor and the braking torque applied to said motor and the speed at which said motor is deenergized.

No references cited.